Patented Sept. 6, 1927.

1,641,412

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION.

No Drawing.     Application filed April 27, 1925. Serial No. 26,308.

This invention relates to cellulose acetate compositions of low inflammability. One object of the invention is to provide a cellulose acetate composition the inflammability of which is reduced to an important extent so that it becomes relatively safe, even in the film, lacquer and plastic arts. Another object is to provide a composition which may be made into transparent, strong, flexible films that are substantially waterproof, are unaffected by ordinary photographic baths, combine low inflammability with practical freedom from color and possess, in short, the desired properties of a support for sensitive photographic coatings. Still another object of my invention is to produce a composition which may be used in film, varnish or plastic manufacturing without injury to or being injured by the substances with which it is associated during manufacture, storage or use. Further objects will hereinafter appear.

I have found that cellulose acetate compositions having the desirable qualities enumerated above can be obtained by mixing cellulose acetate, preferably of the acetone-soluble type, with a brom-nucleo substitution product of benzol and its homologues, especially those which are liquid at ordinary temperatures and have saturated side chains like toluene, xylenes, mesitylene, ethyl benzene, cumene and cymene. In all cases the substitution product should be substantially free from uncombined bromine and hydrobromic acid. Moreover, the composition should be effectively neutral,—that is, containing an insufficient concentration of acid to break down the substitution product or liberate bromine from it. I prefer, at present, to use monobrombenzol, parabromotoluene and orthobromotoluene, but it will be understood that my invention is not restricted to these individual substances, except as indicated in the appended claim.

Compositions of cellulose acetate and such brom substitution products have a surprising degree of practical non-inflammability,— that is, an unexpected slowing down of the propagation of combustion therein. Films of such compositions, when ignited, often go out and must be reignited several times during the test, the flame traveling along the film very slowly.

Unless certain precautions are taken, films embodying such compositions may become discolored beyond the manufacturing tolerance which is permissible. The first precaution is to free the brom substitution product from free bromine and free hydrobromic acid. The other precaution is to keep the mixture effectively neutral so that there will be insufficient acid to split up the substitution products. I consider films resulting from these precautions to be colorless when they fall within the customary manufacturing tolerances as regards color.

In one form of my invention I may, for example, dissolve 100 parts by weight of acetone-soluble cellulose acetate in 300 to 500 parts (say 400 parts) of acetone along with 5 to 50 parts (say 30 parts) of monobrombenzol.

In another illustrative embodiment of my invention I may dissolve 100 parts by weight of cellulose acetate in 300 to 500 parts (say 400 parts) of acetone along with 5 to 50 parts of parabromotoluene, 30 parts being typical. In place of the parabromotoluene I may substitute from 5 to 40 parts of orthobromotoluene, 30 parts being typical.

The ingredients are mixed thoroughly to form a homogeneous solution or flowable mass which is filtered if desired. When more flowable solutions are desired, or when the compositions are to be employed as lacquers, the volatile solvent may be increased, as will be understood by those skilled in the art, or volatile non-solvents, such as benzol, alcohol, and the like may be added, but not to the point where precipitation occurs. Along with the ingredients given in the above examples, I may add one or more organic bodies of only slight volatility which enhance the plasticity or flexibility of the compositions, and regulate the preparation of film therefrom; but such bodies are not preferred or essential. Examples of them are amyl or butyl acetate, the various amyl alcohols, the various butyl alcohols, and mixtures of them.

Films prepared from the hereinabove described compositions are flexible, smooth, transparent and suitable for photographic purposes. Moreover, the absence of free bromine and free hydrobromic acid initially and throughout the useful life of the films, prevents injury to any photographic coatings or discoloration of the composition. Of course, a small amount of a substance which absorbs bromine (like dicyandiamine) and blends with the other ingredients of the film without injuring the photographic coatings may be incorporated in the compositions as an insurance against trouble, but this is unnecessary when the composition is prepared with reasonable care while observing the precautions hereinabove set forth.

Having thus described my invention, what I claim as new and desire to secure by Letters Patent is:

As an article of manufacture, a substantially colorless, transparent, flowed film of low inflammability, which is substantially inert toward photographic coatings, which comprises acetone-soluble cellulose acetate and a substance selected from the group of monobrom benzols and monobrom toluenes, which is substantially free from uncombined bromine and hydrobromic acid, said film being formed from a composition containing from 5 to 50 parts by weight of said substance for every 100 parts of said acetate.

Signed at Rochester, New York this 25th day of April, 1925.

STEWART J. CARROLL.